US009086882B2

(12) United States Patent
Poddar

(10) Patent No.: US 9,086,882 B2
(45) Date of Patent: Jul. 21, 2015

(54) DRAM ENERGY USE OPTIMIZATION USING APPLICATION INFORMATION

(75) Inventor: Indrajit Poddar, Sewickley, PA (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 13/568,581

(22) Filed: Aug. 7, 2012

(65) Prior Publication Data

US 2014/0047176 A1 Feb. 13, 2014

(51) Int. Cl.
*G06F 1/32* (2006.01)
*G06F 12/08* (2006.01)
*G06F 12/12* (2006.01)

(52) U.S. Cl.
CPC .............. *G06F 1/3275* (2013.01); *G06F 12/08* (2013.01); *G06F 12/123* (2013.01); *G06F 2212/1028* (2013.01); *Y02B 60/1225* (2013.01); *Y02B 60/1228* (2013.01)

(58) Field of Classification Search
None
See application file for complete search history.

(56) References Cited

U.S. PATENT DOCUMENTS

| | | | |
|---|---|---|---|
| 6,330,639 B1 * | 12/2001 | Fanning et al. | 711/106 |
| 7,081,897 B2 * | 7/2006 | Garg | 345/543 |
| 7,757,039 B2 | 7/2010 | Kaburlasos et al. | |
| 2003/0023825 A1 * | 1/2003 | Woo et al. | 711/170 |
| 2004/0039776 A1 | 2/2004 | Ballard | |
| 2004/0111514 A1 * | 6/2004 | Chase et al. | 709/226 |
| 2005/0078538 A1 | 4/2005 | Hoehler | |
| 2007/0011421 A1 * | 1/2007 | Keller et al. | 711/165 |
| 2008/0320203 A1 | 12/2008 | Fitzgerald | |
| 2011/0145609 A1 * | 6/2011 | Berard et al. | 713/320 |
| 2011/0264938 A1 | 10/2011 | Henroid et al. | |
| 2012/0089772 A1 | 4/2012 | Kardach et al. | |

OTHER PUBLICATIONS

Pisharath, Jayaprakash, Alok Choudhary, and Mahmut Kandemir. "Energy management schemes for memory-resident database systems." Proceedings of the thirteenth ACM international conference on Information and knowledge management. ACM, 2004.*
Wikipedia. "Memcached". Published Jul. 30, 2011.*
Silicon Press. "Web Caching". Published Apr. 7, 2009.*
Memcached. "About Memcached". <http://web.archive.org/web/20100706123715/http://memcached.org/about>. Published Jul. 6, 2010.*
Ousterhout, John. "Demand Paging and Thrashing." Published Spring 2010. <http://web.stanford.edu/class/cs140/cgi-bin/lecture.php?topic=paging>.*
Memcached. "New Overview". Published Apr. 15, 2010. <http://code.google.com/p/memcached/wiki/NewOverview>.*
Dustin. "Memcache maximum key expiration time". Posted Dec. 2, 2009. <http://stackoverflow.com/questions/1418324/memcache-maximum-key-expiration-time>.*

(Continued)

*Primary Examiner* — Charles Rones
*Assistant Examiner* — Hewy Li
(74) *Attorney, Agent, or Firm* — Patricia B. Feighan; Prentiss Johnson

(57) ABSTRACT

An application program identifies a plurality of least recently accessed constructs of the application program that reside in DRAM memory. The application program causes the aggregation of at least a portion of the identified least recently accessed constructs onto one or more pages of the DRAM memory. The application program then causes the one or more memory pages of the DRAM memory to be put into self-refresh operation mode.

9 Claims, 3 Drawing Sheets

(56) References Cited

OTHER PUBLICATIONS

Brandt, T. et al. "Analysis of the PASR Standard and its usability in Handheld Operating Systems such as Linux". Technical report. Intel Corporation 2007.

"%MPG% Method of Refreshing Dynamic Random Access Memory". IP.com Prior Art Database. Technical Disclosure. IP.com number: IPCOM000207336D. IP.com Electronic Publication: May 26, 2011. URL<http://ip.com/IPCOM1000207336>.

* cited by examiner

US 9,086,882 B2

DRAM ENERGY USE OPTIMIZATION USING APPLICATION INFORMATION

FIELD OF THE INVENTION

The present invention relates generally to memory systems, and more particularly to memory systems that use a selective refresh operation.

BACKGROUND

Techniques for reducing the processing time of web based transactions include scale out and scale up strategies in which additional computing resources are made available to handle a transaction workload. Both of these strategies typically include increasing random access memory, typically dynamic random access memory (DRAM), for the purpose of building larger in-memory caches, whether centralized or distributed, to significantly decrease access times to data and web objects. As systems are implemented with increasing amounts of DRAM, the amount of energy consumed by DRAM memory can increase.

DRAM cells need to be refreshed from time-to-time to restore leaking charge and thus maintain their logic state. That is, it is necessary to perform a specified number of refresh operations within a predetermined period of time in order to hold data in DRAM memory in an activated state. DRAM memory devices have two main types of refresh operation modes. One is an auto-refresh operation mode for normal DRAM memory access. The other is a self-refresh operation mode, in which the refresh operation is performed solely to hold data without accessing the DRAM memory device. The self-refresh operation mode is a mode of operation that provides a function of automatically executing the refresh operation inside the DRAM memory device. During operation in self-refresh operation mode, it is possible to hold data with much less power than when a DRAM device is activated for access by an interface unit outside of the DRAM memory device. Various DRAM-level power management schemes allow for different portions of a DRAM memory device to be in either auto-refresh mode or in a self-refresh power-saving mode. There is a performance penalty when accessing a memory location that is in self-refresh mode.

Because not all data in memory is accessed or updated at the same frequency, additional operating system level schemes have been developed to identify low-access data and have this data in memory locations that are in self-refresh mode, thus reducing the memory energy requirements.

SUMMARY

Embodiments of the present invention disclose a method, computer program product, and system for managing dynamic random access memory (DRAM) energy consumption. An application program identifies a plurality of least recently accessed constructs of the application program that reside in DRAM memory. The application program causes the aggregation onto one or more memory pages of at least a portion of the identified least recently accessed constructs. The application program then causes portions of DRAM that contain the one or more memory pages to be put into self-refresh operation mode.

DETAILED DESCRIPTION

Embodiments of the present invention will now be described in detail with reference to the accompanying drawings.

Figure 1:
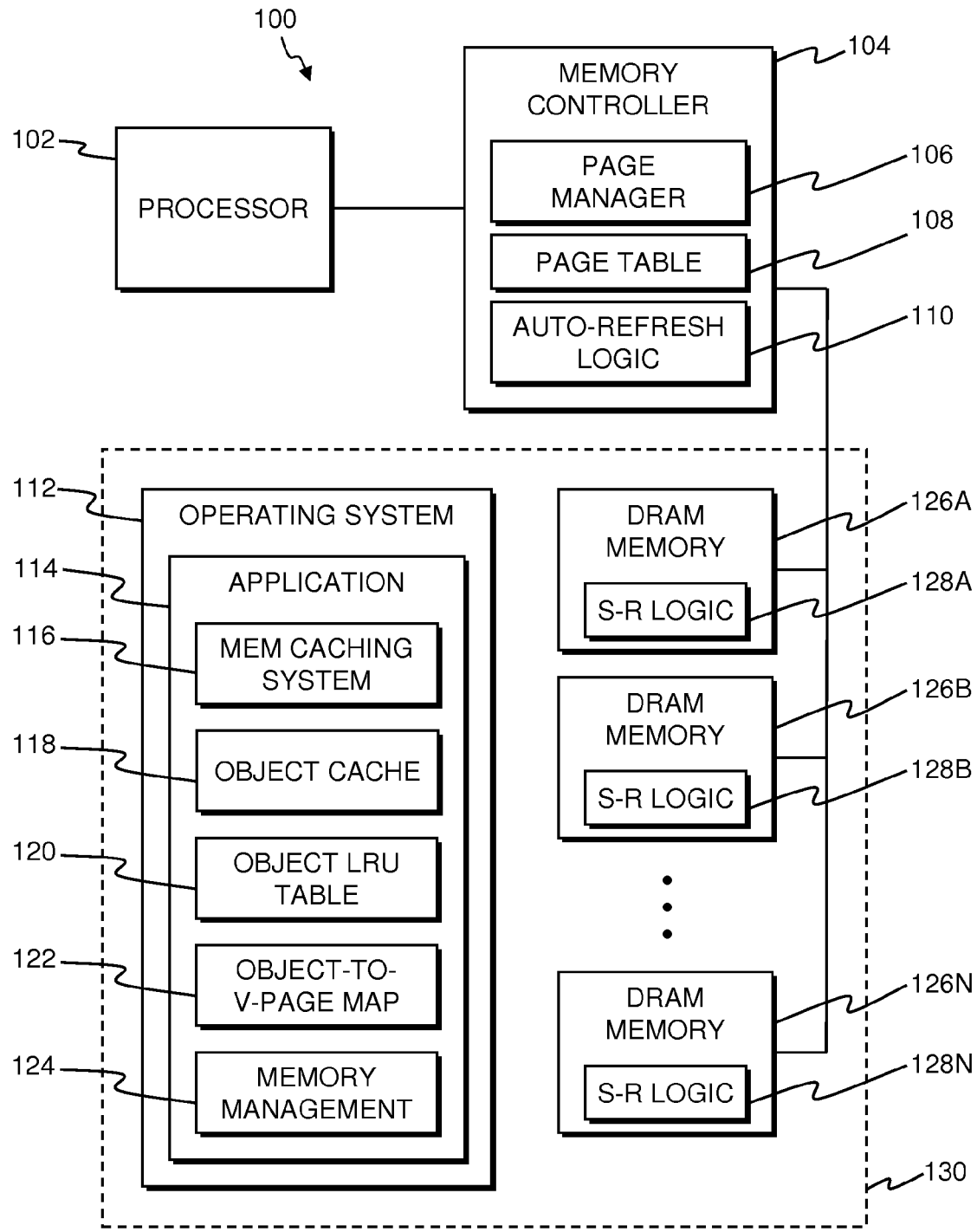
FIG. 1 is a functional block diagram of a computer system that implements DRAM energy use optimization in accordance with an embodiment of the present invention.

FIG. 1 is a functional block diagram of a computer system that implements DRAM energy use optimization system 100 in accordance with an embodiment of the present invention. DRAM energy use optimization system 100 includes processor 102, memory controller 104, operating system (OS) 112, and dynamic random access memory (DRAM) devices 126A to 126N. Operating system 112 will typically have programs and modules that will reside in DRAM memory devices 126A to 126N at any given time, as indicated by dotted box 130.

Processor 102 executes instructions, for example, of OS 112 or of one or more applications, for example, application 114. Processor 102 can include, for example, a central processing unit, one or more processor cores, a single-core processor, a dual-core processor, a multiple-core processor, a microprocessor, a host processor, a controller, a plurality of processors or controllers, a chip, a microchip, one or more circuits, circuitry, a logic unit, an integrated circuit (IC), an application-specific IC (ASIC), or any other suitable multipurpose or specific processor or controller.

Memory controller 104 includes page manager 106, page table 108, and auto-refresh logic 110. Memory controller 104, operating with direction from OS 112, allocates to OS 112 or one or more applications, for example, application 114, physical memory areas of main memory, for example, physical areas of DRAM memory devices 126A to 126N. The allocation is typically performed by allocating physical memory pages to logical, or virtual, memory pages. Logical and physical memory pages typically have the same predefined size. Memory controller 104 translates logical page addresses referred to by page manager 106 to physical addresses in main memory, for example, DRAM memory devices 126A to 126N. Page table 108 contains information that maps logical memory pages to physical memory pages. When an application is launched, for example, application 114, memory controller 104 determines whether a physical memory area is available in order to perform an allocation of some or all of the physical memory area to logical memory pages of the application. Page manager 106, through the use of page table 108, determines how logical memory pages will translate to physical memory areas, for example, DRAM memory devices 126A to 126N, by using pointers, shortcuts, address lookup or translation tables, or the like. Auto-refresh logic 110 activates DRAM refresh operations initiated and controlled by memory controller 104.

In embodiments of the invention, DRAM memory devices 126A to 126N represents the DRAM memory that constitutes main memory in DRAM energy use optimization system 100. Memory controller 104 controls general operation of DRAM memory devices 126A to 126N, particularly the power management of DRAM memory devices 126A to 126N. In embodiments of the invention, DRAM memory devices 126A to 126N are capable of operation in both auto-refresh operation mode and self-refresh operation mode. Self-refresh (S-R) logic modules 128A to 128N control the operation of DRAM memory devices 126A to 126N, respectively, when a DRAM memory device 126 is put into self-refresh operation mode.

Figure 2:
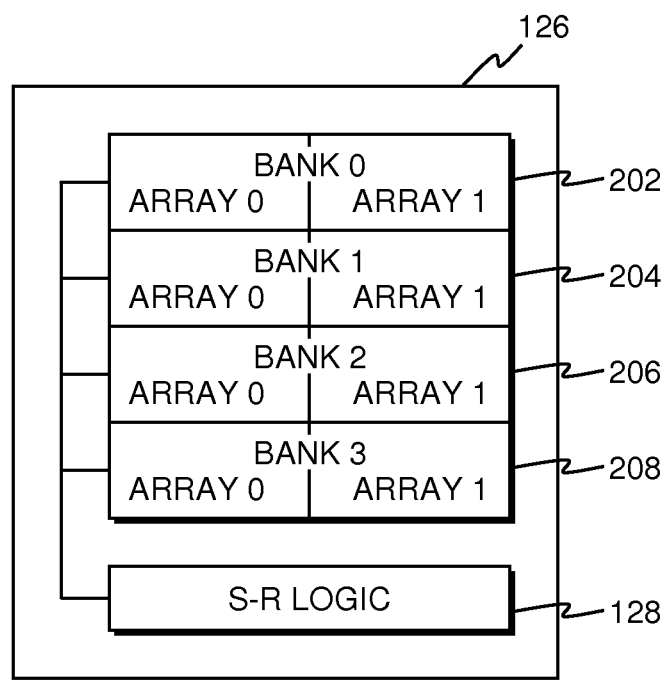
FIG. 2 is a functional block diagram of a DRAM memory device used in the system of FIG. 1, in accordance with an embodiment of the present invention.

FIG. 2 shows an exemplary embodiment of a DRAM memory device 126. In embodiments of the invention, a DRAM memory device 126 includes units of memory cells that memory controller 104 can separately put into self-refresh operation mode. For example, as shown in FIG. 2, the memory cells of DRAM memory device 126 are grouped into banks, such as banks 0 to 3 shown as elements 202 to 208, respectively. Each of banks 0 to 3 is further divided into arrays 0 and 1, each of which can separately be put into self-refresh operation mode by, for example, a command from memory controller 104 at the request of operating system 112 via processor 102. When a DRAM memory device 126 is in self-refresh operation mode, the management of the mode is controlled by S-R logic module 128.

Although FIG. 2 shows the memory cells of DRAM memory device 126 grouped into sets of arrays 0 and 1, other self-refresh operation mode power management schemes may be used in which the memory cells of a DRAM memory device 126 are grouped differently. For example, a power management scheme called Partial Array Self Refresh (PASR) allows for self-refresh mode to be restricted to a variable portion of a DRAM bank. With PASR, select portions of DRAM that are not active but contain valid data can be put into self-refresh, and portions that are not active and contain no data can be powered off and allowed to leak. DRAM standards published by the Joint Electronic Device Engineering Council (JEDEC), suggest that DRAM device manufacturers allow for a single-ended PASR implementation in which at least all of DRAM memory, the first half of DRAM memory, or the first quarter of DRAM memory, and optionally the first eighth or first sixteenth of DRAM memory, can be put into self-refresh operation mode. Other proposed PASR implementations suggest a dual-ended scheme in which the self-refresh regions are selected from the top and bottom of DRAM memory, or a bank-selective scheme in which each bank, array, or other sub-unit of DRAM memory can be independently put into self-refresh. See, e.g., Brandt et al, "Analysis of the PASR Standard and its Usability in Handheld Operating Systems such as Linux," technical report, Intel Corporation 2007.

In preferred embodiments of the invention, application 114 is an object or database oriented web application that can realize performance improvements when implemented as an in-memory, cache based application. For example, DRAM energy use optimization system 100 resides on an Internet-based server computer, on which a significant number of certain web objects, database transactions, or other application constructs, also referred to herein as objects, are regularly and frequently requested by users on the Internet. Having these certain web objects, database transactions, or other application constructs cached in memory, for example, DRAM memory devices 126A to 126N, can reduce database and API calls, and thus increase performance and response time in satisfying an object, transaction, or other application construct request.

In preferred embodiments, application 114 includes memory caching system 116, object cache 118, object LRU table 120, object-to-virtual page map 122, and memory management module 124. In a preferred embodiment, memory caching system 116 is a system such as memcached, which was developed by Danga Interactive Inc. and is distributed under a permissive free software license. In other preferred embodiments, memory caching system 116 is an in-memory database application, such as solidDB, a product of International Business Machines Corporation or Oracle Berkeley DB, a product of Oracle Corporation.

Object cache 118 is an in-memory cache for containing application constructs, such as web objects, database transactions, or database tables that are being regularly and frequently requested by, for example, users on the Internet. In a preferred embodiment, object cache 118 is managed by memory caching system 116. Object LRU table 120 represents an in-memory data structure that provides information related to when a cache object was last accessed. In a preferred embodiment, object LRU table 120 is maintained by memory caching system 116. In certain embodiments, object LRU table 120 can be integral to memory caching system 116. In an exemplary embodiment, each object in object cache 118 has an associated entry in object LRU table 120 that contains a timestamp representing the last time the object was accessed, a self-refresh indicator to indicate whether an object is on a virtual page for which a request to put the page into self-refresh mode has been made, and may contain, for example, an object expiration time which could be a default value or never. Generally, if object cache 118 is full and a user is requesting access to an object not currently in the object cache, then memory caching system 116 will overwrite a least recently used, or accessed, object (of the appropriate size) as determined by object LRU table 120 with the requested object, and may freely overwrite any expired object (of the appropriate size).

In embodiments of the invention, DRAM energy use optimization system 100 can be a system primarily dedicated to the execution of application 114, such as a network server running a single object or database oriented web application. The amount of physical memory installed in DRAM energy use optimization system 100 can be based on an allocation size of object cache 118 determined to reduce or eliminate the number of faults for requested objects. In certain embodiments, the amount of installed physical memory, for example, DRAM memory devices 126A to 126N, can be relatively large. If it is determined that a relatively large number of portions of DRAM that are put into self-refresh operation mode, in accordance with embodiments of the invention, are reactivated for normal access in a relatively short time period, this tends to indicate that additional physical memory should be allocated to object cache 118. However, this should be weighed against other considerations, including cost and desired response levels.

Object-to-virtual page map 122 records the virtual page location of each object in object cache 118. For example, as objects are read into object cache 118, entries can be created in object-to-virtual page map 122 that record that virtual page location and size of the object. In certain implementations of the preferred embodiment, the size of the object can be the size of the memory chunk in which the object resides. In preferred embodiments, object-to-virtual page map 122 is maintained by memory caching system 116 as objects are read into object cache 118, and also by memory management module 124 as objects are moved within object cache 118. In certain embodiments, the information in object-to-virtual page map 122 may be integrated into object LRU table 120.

Memory management module 124 operates generally to aggregate low-access objects in object cache 118 into specific virtual pages, and directs memory controller 104 to put the specific virtual pages into self-refresh operation mode. In preferred embodiments, memory management module 124 can be a module within application 114, as illustrated in FIG. 1, a module that is called by application 114, for example, a module in a dynamic load library, a separate application running under operating system 112, or can be integral to memory caching system 116.

Figure 3:
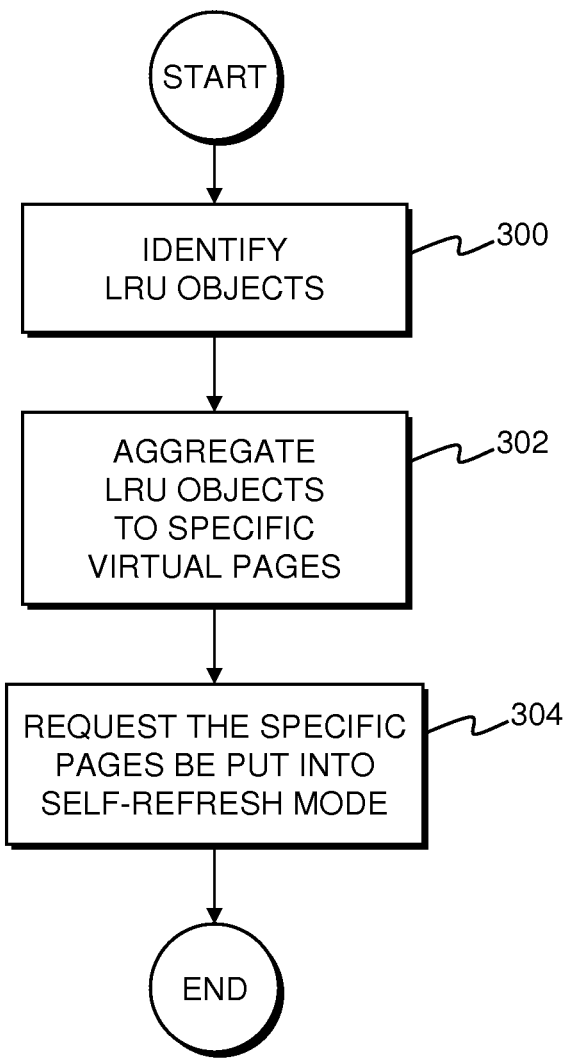
FIG. 3 is a flowchart depicting the steps of a memory management module in accordance with an embodiment of the present invention.

FIG. 3 is a flowchart depicting the steps of memory management module 124 in accordance with an embodiment of the present invention. In operation, in preferred embodiments, memory management module 124 is invoked periodically by, for example, memory caching system 116. In other embodiments, memory management module 124 may be invoked periodically by operating system 112, or may be invoked based on a scheduling timer. When memory management module 124 is invoked, it identifies least recently used (LRU) objects in object cache 118 that are candidates to move to portions of physical memory that will be put into self-refresh operation mode (step 300). In embodiments of the invention, memory management module 124 identifies the least recently used objects based on information in object LRU table 120. In preferred embodiments of the invention, candidates in object LRU table 120 are identified as objects that have not been accessed within a certain time period, for example, within one minute of when memory management module 124 is invoked. The entries in object LRU table 120 can be accessed in sorted order from the least recently used object that is identified. In certain embodiments, objects that have expired can be ignored.

After LRU objects in object cache 118 have been identified as candidates to put into self-refresh operation mode (step 300), the identified LRU objects are aggregated to specific virtual pages of object cache 118 (step 302). In one embodiment, a simple algorithm may identify the virtual page containing the least recently used object. Then, through a series of memory swap operations, swap the next least recently used objects in sorted order that are on different virtual pages to the identified virtual page until the identified page contains only objects from the sorted list of least recently used objects, beginning with the least recently used object, sufficient to fill the identified virtual page. If there is sufficient memory allocated to object cache 118, or a sufficient number of LRU objects are not reactivated within a relatively short time of being put into self-refresh mode, additional virtual pages of object cache 118 can be filled with LRU objects from the sorted list of least recently used objects derived from object LRU table 120. This simple algorithm would be executed each time memory management module 124 is invoked to aggregate the LRU objects. In other embodiments, objects on the identified virtual page that have expired can be overwritten, rather than swapped, with LRU objects.

Certain algorithms might seek to minimize the number of memory swap and memory move operations by, for example, identifying the virtual pages of object cache 118 that contain the highest number of LRU objects, regardless of the page on which the least recently used object resides, and use these pages to aggregate LRU objects. In certain embodiments, it may be preferred to identify contiguous virtual pages on which to aggregate LRU objects. In other embodiments, object LRU table 120 may be segmented by object size, for example, chunk size. In such an embodiment, aggregation of LRU objects may occur at the slab level such that the LRU aggregation algorithm is performed separately for slab defining a different chunk size. It will be recognized that those having skill in the art of the invention will make modifications as needed to embodiments of the algorithm described above for specific desired implementations of the invention.

In preferred embodiments of the invention, a page corresponds to the smallest unit of memory in a DRAM memory device 126 that can be put into self-refresh mode. Thus, an array, as illustrated in FIG. 2, would correspond to a memory page. In other embodiments in which the smallest unit of memory in a DRAM memory device 126 that can be put into self-refresh mode is two or more pages, it may be advantageous to identify one or more sets of the same number of contiguous pages of virtual memory to fill with identified LRU objects.

After LRU objects that are candidates to be put into self-refresh mode have been aggregated to specific virtual pages (step 302), memory management module 124 requests the specific virtual pages be put into self-refresh mode (step 304). This can be accomplished, for example, by memory management module 124 notifying the operating system that the specific virtual pages be put into self-refresh mode, and the operating system issuing the appropriate command to memory controller 104. If a portion of memory is already in self-refresh operation mode, a command to put that portion into self-refresh mode will have no effect.

Because DRAM energy use optimization system 100 has no control over what objects are requested, an object residing on a page that is in self-refresh operation mode can be requested at any time. If such a request is received, the portion of DRAM memory device 126 in self-refresh mode that contains the requested object will be activated, and the requested object will be retrieved. During the next iteration of the algorithm, the requested object will likely not be identified as an LRU object, and the requested object will be replaced by an object identified as an LRU object to be put into self-refresh mode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Based on the foregoing, a computer system, method and program product have been disclosed in accordance with the present invention. However, numerous modifications and substitutions can be made without deviating from the scope of the present invention. Therefore, the present invention has been disclosed by way of example and not limitation.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

What is claimed is:

1. A method for managing dynamic random access memory (DRAM) energy consumption, the method comprising the steps of:

an application program identifying a plurality of least recently accessed constructs of the application program that reside in DRAM memory, wherein the identified plurality of least recently accessed constructs comprise web objects associated with an in-memory object caching system, database transactions associated with an in-memory database application, and in-memory database tables associated with an in-memory database application, wherein each construct within the identified plurality of least recently accessed constructs has an associated entry in a least recently used (LRU) table, wherein the entry includes a timestamp representing the last time each construct was accessed, a self-refresh indicator to indicate whether an object is on a virtual page for which a request to put the virtual page into a self-refresh mode has been made, and an expiration time equal to a default value or never;

the application program causing the aggregation of at least a portion of the identified least recently accessed constructs onto one or more pages of the DRAM memory based on the associated entry of each identified least recently accessed construct within the portion of the identified least recently accessed constructs;

the application program causing the one or more memory pages of the DRAM memory to be put into self-refresh operation mode;

determining a number of portions of the DRAM memory being taken out of self-refresh operation mode within a period of time; and indicating whether a plurality of additional physical memory should be allocated to an in-memory cache associated with the identified plurality of least recently accessed constructs based on the determining the number of portions of the DRAM memory being taken out of self-refresh operation mode within the period of time.

2. The method in accordance with claim 1, wherein the aggregation onto one or more memory pages comprises:

identifying a memory page that contains one or more of the identified plurality of least recently accessed constructs; and swapping other identified least recently accessed constructs onto the identified memory page until the identified memory page contains only identified least recently accessed constructs.

3. The method in accordance with claim 2, wherein the swapping of other identified least recently accessed constructs onto the identified memory page until the identified memory page contains only identified least recently accessed constructs comprises:

overwriting expired constructs on the identified memory page with the other identified least recently accessed constructs.

4. A computer program product for managing dynamic random access memory (DRAM) energy consumption, the computer program product comprising:

one or more non-transitory computer-readable storage media and program instructions stored on the one or more computer-readable storage media, the program instructions comprising:

application program instructions to identify a plurality of least recently accessed constructs of the application program that reside in DRAM memory, wherein the identified plurality of least recently accessed constructs comprise web objects associated with an in-memory object caching system, database transactions associated with an in-memory database application, and in-memory database tables associated with an in-memory database application, wherein each construct within the identified plurality of least recently accessed constructs has an associated entry in a least recently used (LRU) table, wherein the entry includes a timestamp representing the last time each construct was accessed, a self-refresh indicator to indicate whether an object is on a virtual page for which a request to put the virtual page into a self-refresh mode has been made, and an expiration time equal to a default value or never;

application program instructions to cause the aggregation of at least a portion of the identified least recently accessed constructs onto one or more pages of the DRAM memory based on the associated entry of each identified least recently accessed construct within the portion of the identified least recently accessed constructs;

application program instructions to cause the one or more memory pages of the DRAM memory to be put into self-refresh operation mode;

determining a number of portions of the DRAM memory being taken out of self-refresh operation mode within a period of time; and indicating whether a plurality of additional physical memory should be allocated to an in-memory cache associated with the identified plurality of least recently accessed constructs based on the determining the number of portions of the DRAM memory being taken out of self-refresh operation mode within the period of time.

5. The computer program product in accordance with claim 4, wherein the application program instructions to cause the aggregation onto one or more memory pages comprises:

application program instructions to identify a memory page that contains one or more of the identified plurality of least recently accessed constructs; and application program instructions to swap other identified least recently accessed constructs onto the identified memory page until the identified memory page contains only identified least recently accessed constructs.

6. The computer program product in accordance with claim 5, wherein the application program instructions to swap other identified least recently accessed constructs onto the identified memory page until the identified memory page contains only identified least recently accessed constructs comprises:

application program instructions to overwrite expired constructs on the identified memory page with the other identified least recently accessed constructs.

7. A computer system for managing dynamic random access memory (DRAM) energy consumption, the computer system comprising:

one or more computer processors;

one or more non-transitory computer-readable storage media;

program instructions stored on the computer-readable storage media for execution by at least one of the one or more processors, the program instructions comprising:

application program instructions to identify a plurality of least recently accessed constructs of the application program that reside in DRAM memory, wherein the identified plurality of least recently accessed constructs comprise web objects associated with an in-memory object caching system, database transactions associated with an in-memory database application, and in-memory database tables associated with an in-memory database application, wherein each construct within the identified plurality of least recently accessed constructs has an associated entry in a least recently used (LRU) table, wherein the entry includes a timestamp representing the last time each construct was accessed, a self-refresh indicator to indicate whether an object is on a virtual page for which a request to put the virtual page into a self-refresh mode has been made, and an expiration time equal to a default value or never;

application program instructions to cause the aggregation of at least a portion of the identified least recently accessed constructs onto one or more pages of the DRAM memory based on the associated entry of each identified least recently accessed construct within the portion of the identified least recently accessed constructs;

application program instructions to cause the one or more memory pages of the DRAM memory to be put into self-refresh operation mode;

determining a number of portions of the DRAM memory being taken out of self-refresh operation mode within a period of time; and indicating whether a plurality of additional physical memory should be allocated to an in-memory cache associated with the identified plurality of least recently accessed constructs based on the determining the number of portions of the DRAM memory being taken out of self-refresh operation mode within the period of time.

8. The computer system in accordance with claim 7, wherein the application program instructions to cause the aggregation onto one or more memory pages comprises:

program instructions to identify a memory page that contains one or more of the identified plurality of least recently accessed constructs; and program instructions to swap other identified least recently accessed constructs onto the identified memory page until the identified memory page contains only identified least recently accessed constructs.

9. The computer system in accordance with claim 8, wherein the application program instructions to swap other identified least recently accessed constructs onto the identified memory page until the identified memory page contains only identified least recently accessed constructs comprises:

application program instructions to overwrite expired constructs on the identified memory page with the other identified least recently accessed constructs.

* * * * *